A-A

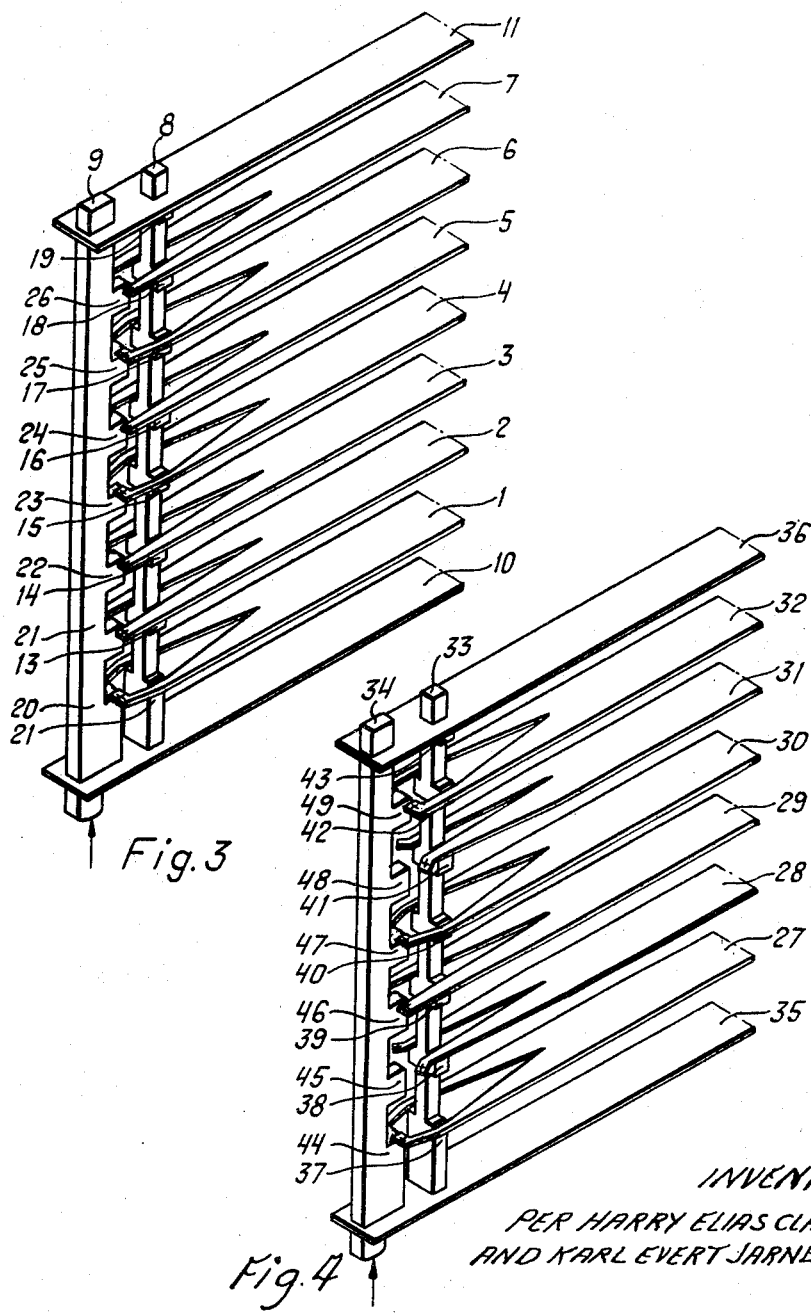

INVENTORS
PER HARRY ELIAS CLAESSON
AND KARL EVERT JARNBRINK

BY
ATTORNEYS

May 4, 1965    P. H. E. CLAESSON ETAL    3,182,159
CONTACT SPRING GROUP FOR RELAYS, CHANGE-OVER
SWITCHES AND THE LIKE
Filed April 17, 1961    5 Sheets-Sheet 4

INVENTORS
PER HARRY ELIAS CLAESSON
AND KARL EVERT JARNBRINK

BY
Wenderoth, Lind & Ponack
ATTORNEYS

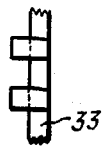
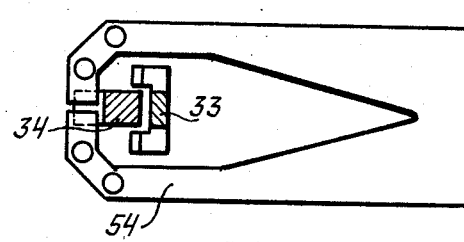
Fig. 12    Fig. 13
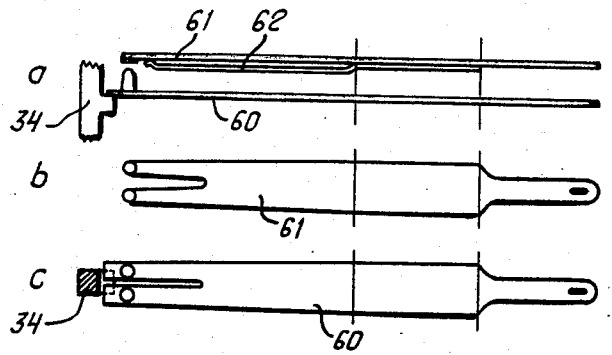
Fig. 14
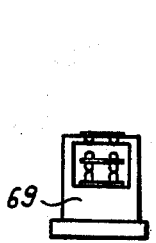
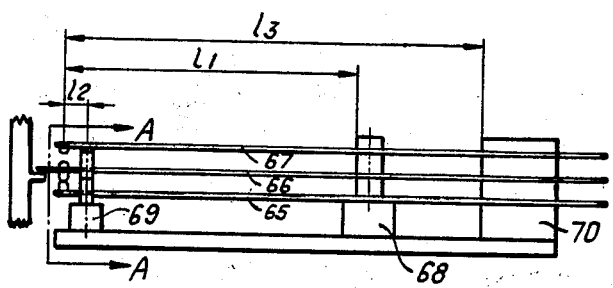
Fig. 15
A-A
Fig. 16
INVENTORS
PER HARRY ELIAS CLAESSON
AND KARL EVERT JARNBRINK
BY
ATTORNEYS

United States Patent Office 3,182,159
Patented May 4, 1965

3,182,159
CONTACT SPRING GROUP FOR RELAYS,
CHANGE-OVER SWITCHES AND THE
LIKE
Per Harry Elias Claesson, Osterhagen, Drevviken, Sweden, and Karl Evert Jarnbrink, Grunsgatan 3, Farsta,
Sweden
Filed Apr. 17, 1961, Ser. No. 103,529
Claims priority, application Sweden, Apr. 19, 1960,
3,804/60; Apr. 13, 1961, 3,868/61
6 Claims. (Cl. 200—166)

This invention relates to contact spring groups having fixed and movable contact springs wherein the contacts are of the twin-contact type.

A very large number of contact spring groups of the aforesaid type are already known, but all of them include the disadvantage of so-called contact vibration. In addition, most of the known devices have the disadvantage that a great deal of work is involved in adjusting the contact spacings and the contact pressure to correct values.

According to the present invention, these disadvantages are overcome. The invention is characterized in that the fixed and/or movable contact springs are provided with two shanks having a contact surface at the end of each shank, that means are provided for supporting each shank in the vicinity of its contact surface, and that the contact springs, except the contact surfaces, are shaped such, that the bending of a spring caused by the actuation of the relay causes an alteration of the radius of curvature of the spring, the mean value of which is at the shanked portion of the spring greater, preferably considerably greater than the mean value of the corresponding alteration at the non-shanked portion of the spring.

Figure 1:
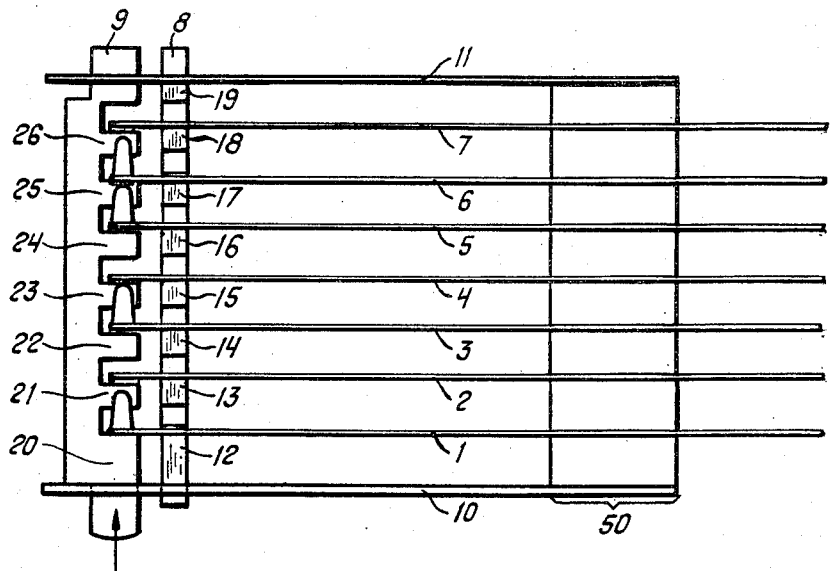
Figure 2:
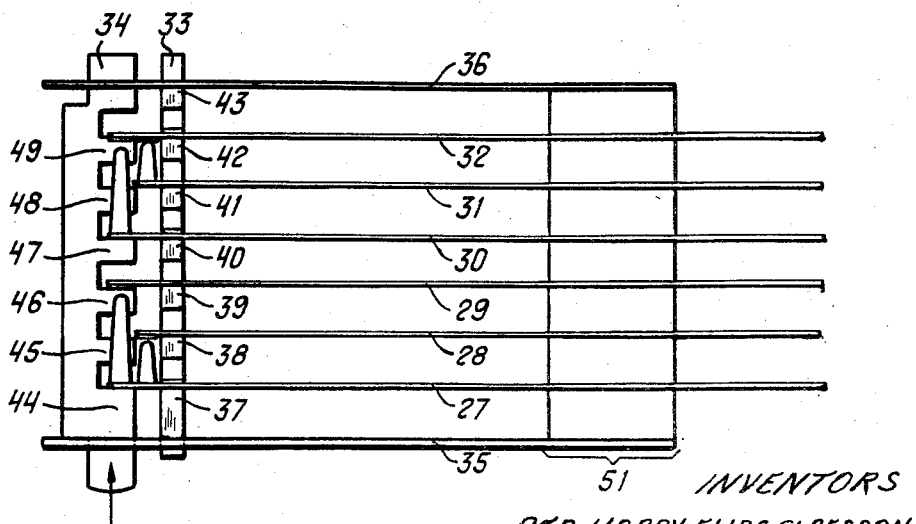
Figure 5:
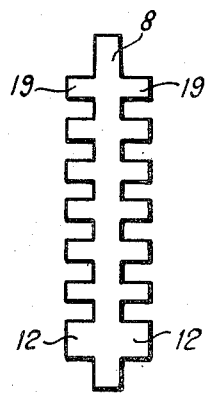
Figure 10:
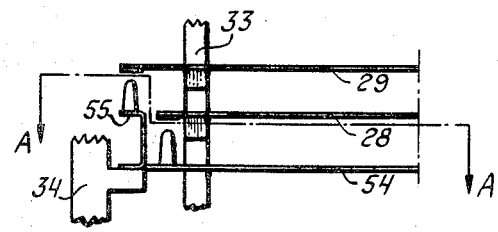
Figure 11:
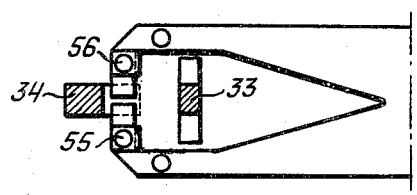

The invention will now be described in greater detail, reference being had to the accompanying FIGS. 1–16. FIGS. 1 and 2 illustrate the contact spring groups seen from the side, FIGS. 3 and 4 show the same contact spring groups in perspective, FIG. 5 shows a support bar for the fixed contact springs, FIGS. 6–9 show contact springs according to the invention, FIGS. 10 and 11 show a modification of the invention to suit a so-called double make contact, FIGS. 12 and 13 show a further modification of the invention as regards the shape of the support bars, FIG. 14 shows a contact spring group in principle wherein the fixed contact springs are supported by a support spring, and, finally, FIGS. 15 and 16 show a test device by means of which the free lengths of contact springs have been determined.

The object of the perspective drawing shown in FIGS. 3 and 4 is to show the support bars and the appearance of the contact springs in a greater detail than in FIGS. 1 and 2. In this embodiment, the contact springs are drawn apart so as to prevent the engagement of their outlines being hidden. The actual contacts are not included, because the contact springs are shown so far apart, that it would not be possible to show the actual contacts and their function. The surfaces of the teeth on the bars forming the support for the contact springs are indicated in FIGS. 3 and 4 by shading, inasfar and to the extent, that they are not hidden by the contact springs. The teeth on the support bars are also shaded in FIGS. 1 and 2.

The contact spring group according to FIGS. 1 and 3 comprises the contact springs 1–7, a support bar 8 and a lift bar 9. The support bar 8 is fixed in correct position by means of its teeth 12 and 19 engaging against springs 10 and 11. Said support bar 8 which is also shown in FIG. 5, comprises pairs of teeth 12 and 19. The lift bar 9 is guided in the springs 10 and 11 and provided with teeth 20–26.

The contact spring group according to FIGS. 1 and 3 provides one make contact, one break contact and one change-over contact. The contact springs 1 and 2 form the make contact, 1 being the movable contact spring supported against the tooth 20 on the bar 9, and 2 being the fixed contact spring supported by the tooth 13 on the bar 8. When the lift bar 9, by means of a relay armature for example, is lifted in the direction indicated by the arrow, then the free end of the spring 1 is also lifted such, that contact is obtained between the contacts on springs 1 and 2.

The contact springs 3 and 4 form the break contact. The fixed contact spring 3 is supported against the tooth 14 on the bar 8, and the movable contact spring 4 against the contacts on the contact spring 3. When the bar 9 moves, the contact spring 4 is lifted such, that the contact is broken.

The contact springs 5–7 provide the changeover contact. In this embodiment, the contacts 5 and 7 are supported against the teeth 16 and 18 respectively on the bar 8, and the movable contact spring 6 against the contacts on the contact spring 5. When the bar 9 moves, the contact spring 6 is lifted such, that the contact between the springs 5 and 6 is broken and the contact between the springs 6 and 7 is closed.

The contact spring groups according to FIGS. 2 and 4 have a double make contact and a continuous changeover contact. They comprise contact springs 27–32, a support bar 33 and a lift bar 34. The support bar 33 is supported against its teeth 37 and 43 bettwen the springs 35 and 36, the lift bar 34 is guided by holes in the said springs. The support bar 33 is provided with teeth 37–43, and the lift bar 34 with teeth 44–49. The double make contact is formed by the contact springs 27–29. The movable contact spring 27 rests against the tooth 44 on the movable bar 34. The two fixed contact springs 28 and 29 are supported against the teeth 38 and 39 respectively, on a fixed bar 33. When the bar 34 moves in the direction of the arrow, the contact spring 27 is lifted such, that a contact is made between the contacts associated with all three contact springs 27–29.

The contact springs 30–32 form a continuous changeover contact. The movable contact spring 30 is supported against a tooth 47 on the bar 34, and the fixed contact spring 31 against a tooth 41 on the bar 43. The contact spring 32, the changeover spring, is supported against the spring 31 via the contacts in the normal manner. When the bar 34 moves, the contact spring 30 is lifted such, that a contact is made between the contacts on the springs 30 and 32, whereupon the spring 32 is even lifted, so that a break is made between the contacts associated with the springs 31 and 32.

As appears clearly from FIGS. 3 and 4, the spacing between the shanks on all the fixed contact springs is relatively small, so that the shanks can be supported against the teeth of the support bar 8 and 33 respectively. On the other hand, the spacing between the shanks on the movable contact springs is relatively large, so that the teeth on the fixed support bar 8 and 33 respectively clear the shanks, i.e., the spacing between the latter shanks is greater than the width of the fixed bar, including the length of the teeth.

Figure 6:
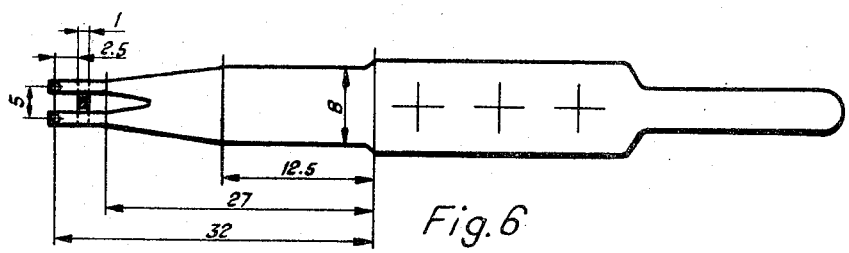

FIGS. 6–9 show the shapes of the various contact springs and their dimensions in mm., without contacts, in an embodiment of the invention. Thus FIG. 6 shows a fixed contact spring which, on FIGS. 1 and 2, is shown as springs 2, 7 and 29 with flat, low contacts, and as springs 3 and 5 with contacts of medium height.

Figure 7:
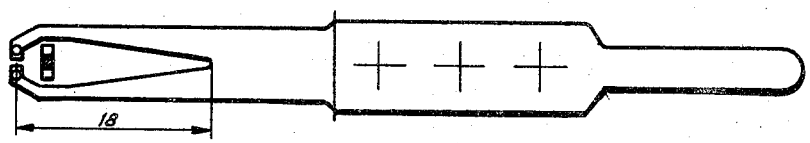

FIG. 7 shows a movable contact spring which, in the figures just referred to, is shown as a spring 4 with flat, low contacts, as springs 1 and 6 with contacts of medium height, and as a spring 30 with high contacts.

Figure 8:
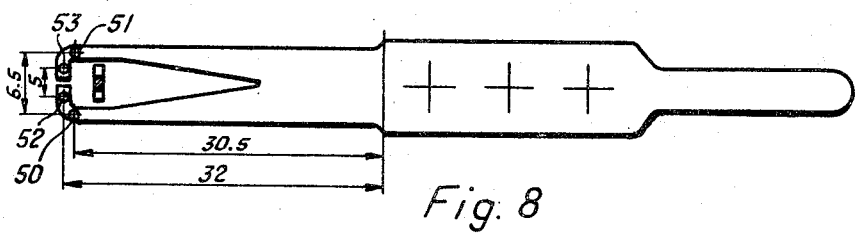

FIG. 8 shows a movable contact spring, having locations as indicated on the drawing, where two pairs of contacts can be arranged, the said contact spring being shown on FIG. 2 as a spring 27 with two medium-long and two long contacts, and as a spring 32 with two pairs of flat, low contacts. In the latter case, a notch is made in the spring (see FIG. 8) between the two contacts which are furtherest away at the ends, so that the spring cannot be actuated by the movable bar 34.

Figure 9:
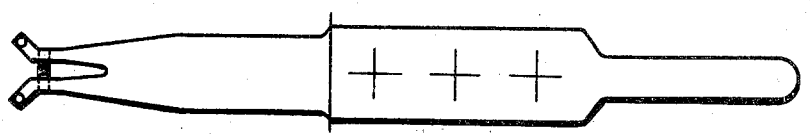

FIG. 9 shows a spring which is shown in FIG. 2 as a spring 28 with flat, low contacts, and as a spring 31 with medium-high contacts.

Thus, two pairs of contacts can be attached to the contact spring according to FIG. 8, one pair of which—located to the points 50 and 51—are laterally displaced as related to the locations of the contacts 52 and 53, and somewhat towards the attachment point of the springs. This means, that the contacts at the points 52 and 53 coincide with the contacts associated with the springs according to FIGS. 6 and 7, while the contacts at the points 50 and 51 coincide with the contacts on the spring according to FIG. 9. As a result of the said location of the contacts, in cases where certain contact springs have two pairs of contacts, e.g., in the case of double contacts and continuous changeovers, both pairs of contacts can clear each other. Moreover, the short, fixed contact spring according to FIG. 9 can be made just about as stiff as the long fixed spring according to FIG. 6. This represents an important factor in obtaining the smallest possible contact vibrations, further details of which are given below.

As appears from FIG. 2, the contacts on spring 30 and one pair of contacts on the spring 27 are relatively long. This length of contact can be reduced in the manner shown in FIGS. 10 and 11. The double contact according to FIG. 10 has two fixed contact springs 28 and 29, the support bar 33 and the lift bar 34 in the same arrangement as shown in FIG. 1, but the movable spring 54 differs from the spring 27 in FIG. 1. The said spring 54 has two L-shaped tongues 55 and 56 on which contacts of the medium-long type are arranged. It is obvious that, depending on the length of the portion of the tongues which runs at right angles to the longitudinal direction of the contact springs, the height of the contact can be chosen arbitrarily. FIG. 11 also shows how the support bar 33 and the lift bar 34 are located in relation to each other and to the movable spring 34.

FIGS. 12 and 13 show how the lift bar 34 can be located "behind" the actuator for the movable contact springs, that is looking at them from the contact ends. In order to prevent the teeth which support the fixed contact springs from coming too far to the rear, thus giving rise to possible contact vibrations, the bar 33 is U-shaped, i.e. as shown in the figures.

In the embodiment of the invention according to FIG. 14 which shows a break between the contact springs 60 and 61 and the lift bar 34, the support bar has been replaced by a support spring 62. In the case of contact spring groups having only a few contact springs, this arrangement may prove less expensive because there is no need for means to locate a support bar. The lift bar, too, can be dispensed with in the arrangement according to FIG. 14 and replaced by a block or the like mounted, for example, on a relay armature.

When a support spring is used instead of a support bar, it must be ensured that the stiffness of the spring and the stiffness of the associated movable contact spring— the spacing between the contacts and the support point— are chosen such as to reduce the tendency to contact vibrations to the possible minimum.

In the above, the contacts are shown as separate contact units attached to the contact springs, for example, by means of rivets. As an alternative, the contacts may consist of a suitable contact material, for example rhodium, deposited on the ends of the springs by chemical action or galvanizing. In this case, the ends of the contact springs are preferably manufactured in the manner shown for the spring 54 in FIGS. 10 and 11, so that the movable and the fixed contact springs can come into contact with each other despite relatively thin layers of contact material. By using such a contact layer, the mass of the contact springs is reduced, and there is less risk of contact vibrations than in the case where separate contact units are arranged on the ends of the springs.

An essential feature of the invention is, that the contact springs have a free length—the spacing between the contacts and the point of attachment—and a spacing between the contacts and the supports which is optimum as regards freedom from contact vibration.

The aforesaid feature will be described in greater detail with reference to FIGS. 15 and 16 which show an experimental arrangement for determining the spacing. The contact springs, forming a changeover, are designated 65–67, and their length $l_3$ from the contacts to a fixed attachment 70 is 80 mm. The support 69 for both the fixed springs 65 and 67 can be moved such, that the springs can be supported at an arbitrary distance $l_2$ from the contacts.

The attachment for the springs which gives them a free length of $l_1$ is provided by means of a movable support 68 so that $l_1$ can also be varied within the length $l_3$. When making a test, contact springs 65 and 67 were of hard-rolled nickel-silver, thickness 0.20 mm., while spring 66 was made of the same material and had a thickness of 0.35 mm. The springs were of equal width, 7 mm., and provided with a groove about 1.5 mm. wide and 15 mm. long, so that two shanks were formed. The contacts were made at the ends. It was found, that freedom from contact vibration was only obtained when $l_1$ was 45 mm. and, at the same time, $l_2$ was 5 mm. The contact pressure was 30 grammes in all for both the twin contacts.

Tests have also shown that, when the mass of the contacts and shanks is reduced, the contact vibrations are also reduced, or in other words, the contact pressure at which freedom from vibration is obtained, can be reduced. This will be illustrated in the following by a description of practical tests.

The contact springs according to FIGS. 6–9 were arranged in the manner described in connection with FIGS. 1–3, so that a make contact was obtained. All the springs were 0.25 mm. thick and the material was hard-rolled nickel silver. The contacts on the fixed spring shanks (upper spring) were of silver and in the shape of round plates of a diameter 1.5 mm. and a thickness 0.25 mm., that is of relatively little mass. The contact on the shanks of the movable spring was of the so-called pointed cone type having a maximum diameter of 1.0 mm. and a height of 1.25 mm. When the free length of the contact springs was 32 mm., and the distance between the contacts and the support 2.5 mm. (see FIG. 6), freedom from vibration was obtained at a contact pressure of 18 grammes.

When an extra weight of 10 milligrammes was applied to each shank (opposite the contact on the rivet side), contact vibrations ceased at 25 grammes contact pressure. When the weight on each shank was raised to 20 mg., a contact pressure of 38 g. was required to produce freedom from vibration.

When increasing the weight on the movable contact spring, the bottom spring, instead of the fixed spring, by 20 mg. on each shank, the increase in contact vibrations was insignificant. This proves that, as regards contact vibrations, the said spring is relatively insensitive to increases in weight.

Analogous experiments were carried out in respect of contact breaks, the contacts used being of the same type as those for the make contact tests (FIGS. 6–9). The fixed spring was relatively insensitive to increases in weight as related to contact vibrations. When increasing the weight of the shanks of the movable spring in the same manner as indicated in the above make contact tests, the contact vibrations increased slightly according to the following.

Before increasing the weight, the break contact was free from vibration at a contact pressure of 15 grammes. The weight was increased by 45 g. on each shank, and contact vibrations occurred. These vibrations ceased when the contact pressure was raised to 25 g.

Analogous tests were carried out with a changeover contact which, of course, is a combination of a break and a make contact. The results obtained were substantially the same as those recorded above, viz.: Contact vibrations arose when the weight on the shanks, associated with the make contact (top spring) was raised very slightly, while the changeover spring (intermediate spring) was less sensitive to increases in weight, and the break contact spring (bottom spring) was the least sensitive in this respect.

All of the said experiments prove by their results, that the mass of the movable portion of a spring which, when making contact against another spring is not supported by a support rib, should be as small as possible in order to prevent vibrations. As a consequence thereof, one may say that the smaller the movable portion of a spring, the less vibrations will occur. A spring of uniform thickness which is clamped at one end and has its free end subjected to load, will bend according to the equation of the elastic line:

$$y = \frac{Pl^3}{2Ej}\left(\frac{x}{l} - \frac{1}{3}\cdot\frac{x^3}{l^3}\right)$$

where $y$=the bending, $x$=the distance in the longitudinal direction of the spring, $l$=the horizontal distance between the clamped end and the load end of the spring, $E$=the coefficient of elasticity of the spring material, $j$=the moment of inertia of the cross-section of the spring, and $P$=the loading force. The load end of the spring is located in the origin of coordinates. When differentiating the aforesaid equation twice, the following equations are obtained $$\frac{dy}{dx} = \frac{Pl^3}{2Ej}\left(\frac{1}{l} - \frac{x^2}{l^3}\right)$$

$$\frac{d^2y}{dx^2} = \frac{Pl^3}{2Ej}\cdot\frac{-2x}{l^3} = \frac{-Px}{Ej}$$

The radius of curvature of the spring is $$\rho = \frac{\left[1 + \left(\frac{Pl^3}{2Ej}\left(\frac{1}{l} - \frac{x^2}{l^3}\right)\right)^2\right]^{3/2}}{\frac{-Px}{Ej}}$$

From this equation it becomes evident, that for $x=0$ (in the load point) the radius of curvature is infinite, i.e. the curvature is zero, while for $x=l$ the radius of curvature is maximum:

$$\rho(x=l) = \frac{-1}{\frac{Pl}{Ej}} = \frac{-Ej}{Pl}$$

By bending such a spring, a great part of the mass of the spring will participate in the movement. For this reason, considerable contact vibrations must be expected when the spring is applied in a relay as indicated. The arrangement is highly improved when the shanked contact end of the spring has a moment of inertia $j$ which is of such a small value, that the mean value of the radius of curvature by bending (if the spring was straight from the beginning) the shanked portion of the spring is smaller (preferably much smaller) than the mean value of the radius of curvature of the non-shanked portion.

This may be achieved in several different ways. It is possible to give the non-shanked portion of the spring a width considerably exceeding twice the width of each shank. It further is possible to give the non-shanked portion a thickness considerably exceeding that of the shanked part and, finally, the non-shanked portion may be provided with a longitudinal stiffening, for example in the form of a ridge or of bent-up edges, which stiffening preferably should extend into the clamped portion of the spring.

The spring is, however, frequently curved by pre-bending or other adjusting steps. For this reason, it frequently happens that the spring is not straight from the beginning. The same rule may, therefore, be expressed with more validity by stating, that the bending of the spring obtained by the contact making, should cause an alteration of the radius of curvature having a greater, preferably considerably greater, mean value for the shanked portion of the spring than the corresponding mean value of the non-shanked portion of the spring.

When the contact springs are actuated in the manner described above on breaks, i.e. when the contacts make their contacts when a support is removed from the movable contact spring, a so-called indirect contact action is obtained. However, when a contact is made as a result of a support moving the movable spring towards the fixed spring, a so-called direct action is obtained, this being the case with the make contacts described above.

A known method of reducing the mass of the movable parts of the contact springs is to dimension them in such a manner, that their stress is increased, i.e. to make them narrow and so thick, that the desired contact pressure is obtained. The said principle of dimensioning may be well applied to the ideas presented in the description of the present invention.

It will be understood from the aforesaid tests, that the weight of the movable parts of the contact springs, or the kinetic energy of the said parts, may be greater in the case of indirectly actuated contacts than directly actuated contacts, without giving rise to contact vibration, it being assumed that all other condition are analogous. This is an advantage with indirect action. In certain cases, however, contact spring groups with direct action have certain advantages as compared with indirectly actuated groups. For example, the latter groups—when comprising a plurality of contacts arranged one above the other, e.g. a plurality of make contacts and changeover contacts—require at least one spring to compensate that latent strength in the movable contact springs for the make contacts, and this constitutes a complication. Even when replacing spring groups in operating relays with directly actuated contact springs, there are difficulties involved in inserting indirectly actuated groups because, in both cases, the top and bottom springs are in reversed positions. This leads to confusion when servicing the units.

It appears from the above, that the best application of the invention is to direct action make contacts. However, it is also particularly advantageous to apply the invention to indirect action contacts, because the contact pressure can be reduced while maintaining the freedom from contact vibration.

It appears clearly, that there are optimum values for the free length of the contact springs and for the distance between the contacts and the supports. It would be desirable if these optimum lengths could be determined mathematically, but it has been found that the mathematical approach is very complicated. When making these calculations, it was necessary to introduce such large approximations that no practical comparison could be made. For example, the calculations indicated that contact vibrations would decrease with a decrease in the oscillation of the springs, i.e. as the free length of the springs was increased. However, according to the present invention, the free length chosen should be that which causes the contact vibrations to cease altogether or to be reduced to a minimum.

We claim:
1. In a contact spring group for relays, changeover switches and the like, a number of movable contact springs of the leaf spring type and a number of fixed contact springs of the leaf spring type, each of said fixed contact springs having a solid rear portion and a shanked front portion, the rear part of said rear portion being fastened in a supporting bracket, the front part of said rear portion being freely movable in a plane perpendicular to the plane of the spring, each shank of said shanked portion having a mean stiffness for bending in said plane which is considerably lower than half the mean stiffness of said front part of said rear portion, each of the shanks of said shanked portion having a contact surface at its free end, said contact surface being located opposite to a corresponding contact surface of a movable spring, and means for supporting each shank of said shanked portion close to the contact surface of such shank.

2. In a contact spring group for relays, changeover switches and the like, a number of fixed and movable contact springs of the leaf-spring type, each of said movable contact springs having a solid rear portion and a shanked front portion, the rear part of said rear portion being fastened in a supporting bracket, the front part of said rear portion being freely movable in a plane perpendicular to the plane of the spring, each shank of said shanked portion having a mean stiffness for bending in said plane which is considerably lower than half the mean stiffness of said front part of said rear portion, each of the shanks of said shanked portion having a contact surface at its free end, said contact surface being located opposite to a corresponding contact surface of a movable spring, each of said fixed contact springs having a solid rear portion and a shanked front portion, the contact surfaces being provided at the end of each shank, and means for supporting each shank of said shanked portion close to the contact surface thereof.

3. A contact spring group as claimed in claim 2, wherein actuating means are provided for actuating said movable contact springs so that their contact surfaces are brought to cooperation with the corresponding contact surfaces of said fixed contact springs, said actuating means cooperating with each shank of said shank portions of such movable contact spring close to the contact surface of such shank.

4. In a contact spring group for relays, changeover switches and the like, a number of fixed and movable contact springs of the leaf-spring type, each of said contact springs having a solid rear portion and a shanked front portion, the rear part of said rear portion being fastened in a supporting bracket, the front part of said rear portion being freely movable in a plane perpendicular to the plane of the spring, each shank of said shanked portion having a mean stiffness for bending in said plane which is considerably lower than half the mean stiffness of said front part of said rear portion, each of the shanks of said shanked portion of at least one of said fixed springs having a rear part which is parallel to the longitudinal direction of the spring and a front part which deviates laterally from said longitudinal direction, each of said shanks of said shanked portion having a contact surface at its free end, said contact surface of said spring being located opposite to a corresponding contact surface of a fixed spring, and means for supporting each shank of said shanked portion adjacent the contact surface of such shank.

5. A contact spring group as claimed in claim 4, wherein supporting means are provided for supporting each of said springs with laterally deviated shanks, said supporting means cooperating with each shank of said shanked portion at the rear part thereof, just where said rear part adjoins said front part of such shanked portion.

6. A contact spring as claimed in claim 4, wherein each movable contact spring adapted to cooperate with one of said springs with laterally deviated shanks has a shanked portion, in the rear part of which the shanks are widely separated and in the front part of which the shanks are closer to each other than in said rear part, each shank of said shanked portion having two contact surfaces, viz. one contact surface in said rear part and one contact surface in said front part, the contact surface of said rear part being arranged to cooperate with the contact surface of the shanks of said spring with laterally deviated shanks, said contact surface of said front part being arranged to cooperate with contact surfaces of another of said springs, and wherein supporting means are provided for supporting said contact surfaces of said spring with laterally deviated shanks, said supporting means being adapted to cooperate with each shank of said spring with laterally deviated shanks at the rear part thereof, where said rear part adjoins said front part of such shank.

References Cited by the Examiner
UNITED STATES PATENTS

| | | | |
|---|---|---|---|
| 2,178,151 | 10/39 | Wagar | 200—166 |
| 2,282,687 | 5/42 | Vigren et al. | 200—166 |
| 2,612,367 | 9/52 | Blomquist | 200—166 |

FOREIGN PATENTS

| | | |
|---|---|---|
| 892,479 | 4/44 | France. |
| 1,150,259 | 1/58 | France. |
| 520,811 | 7/53 | Belgium. |
| 846,488 | 8/60 | Great Britain. |

BERNARD A. GILHEANY, *Primary Examiner.*

MAX L. LEVY, *Examiner.*